United States Patent
Kupiec

(10) Patent No.: US 6,533,822 B2
(45) Date of Patent: Mar. 18, 2003

(54) CREATING SUMMARIES ALONG WITH INDICATORS, AND AUTOMATICALLY POSITIONED TABS

(75) Inventor: Julian M. Kupiec, Cupertino, CA (US)

(73) Assignee: Xerox Corporation, Stamford, CT (US)

(*) Notice: Subject to any disclaimer, the term of this patent is extended or adjusted under 35 U.S.C. 154(b) by 1 day.

(21) Appl. No.: 09/016,224

(22) Filed: Jan. 30, 1998

(65) Prior Publication Data

US 2002/0010719 A1 Jan. 24, 2002

(51) Int. Cl.$^7$ .................................................. G06F 7/00
(52) U.S. Cl. ........................ 715/531; 715/530; 345/777
(58) Field of Search ........................ 707/500, 501, 707/530, 531; 345/775–777

(56) References Cited

U.S. PATENT DOCUMENTS

| | | | | |
|---|---|---|---|---|
| 5,077,668 A | * | 12/1991 | Doi | 707/531 |
| 5,204,947 A | * | 4/1993 | Bernstein et al. | 345/357 |
| 5,297,027 A | * | 3/1994 | Morimoto et al. | 707/501 |
| 5,297,249 A | * | 3/1994 | Bersntein et al. | 345/356 |
| 5,367,623 A | * | 11/1994 | Iwai et al. | 345/776 |
| 5,384,703 A | * | 1/1995 | Withgott et al. | 707/531 |
| 5,479,600 A | * | 12/1995 | Wroblewski et al. | 345/777 |
| 5,491,760 A | * | 2/1996 | Withgott et al. | 382/203 |
| 5,506,951 A | * | 4/1996 | Ishikawa | 345/777 |
| 5,526,443 A | | 6/1996 | Nakayama | 382/229 |
| 5,623,679 A | | 4/1997 | Rivette et al. | 707/526 |
| 5,638,543 A | * | 6/1997 | Pedersen et al. | 704/1 |
| 5,696,963 A | | 12/1997 | Ahn | 707/5 |
| 5,721,897 A | * | 2/1998 | Rubinstein | 707/2 |
| 5,778,397 A | * | 7/1998 | Kupiec et al. | 707/500 |
| 5,867,164 A | * | 2/1999 | Bornstein et al. | 345/357 |
| 5,918,240 A | * | 6/1999 | Kupiec et al. | 707/531 |
| 5,924,108 A | * | 7/1999 | Fein et al. | 707/531 |
| 5,975,580 A | * | 11/1999 | Insalaco | 283/67 |
| 5,992,737 A | * | 11/1999 | Kubota | 235/80 |
| 6,014,677 A | * | 1/2000 | Hayashi et al. | 707/104.1 |
| 6,026,388 A | * | 2/2000 | Liddy et al. | 707/1 |
| 6,029,165 A | * | 2/2000 | Gable | 707/3 |
| 6,091,930 A | * | 7/2000 | Mortimer et al. | 434/362 |
| 6,237,011 B1 | * | 5/2001 | Ferguson et al. | 707/515 |
| 6,340,980 B1 | * | 1/2002 | Ho | 345/701 |
| 6,389,434 B1 | * | 5/2002 | Rivette et al. | 707/512 |

FOREIGN PATENT DOCUMENTS

WO     WO 97/38390     10/1997

* cited by examiner

Primary Examiner—Stephen S. Hong
Assistant Examiner—Cesar B Paula
(74) Attorney, Agent, or Firm—Oliff & Berridge, PLC

(57) ABSTRACT

A method and a system for generating a document summary. The method and the system extract text along with corresponding position information from a document, provide the extracted text to a document summarizer and generates a summary with indicators that indicate the corresponding locations in the document from which the summary portions were extracted.

28 Claims, 6 Drawing Sheets

TEXT OF REMARKS BY RNC CHAIRMAN HALEY BARBOUR

MY NAME'S HALEY BARBOUR, AND WE ARE ALL PART OF THE AMERICAN FAMILY. AND WE ALL BELIEVE WE CAN RESTORE THE AMERICAN DREAM.

WE ARE THE REPUBLICAN PARTY — A BIG, BROAD. DIVERSE AND INCLUSIVE PARTY, WITH A COMMON-SENSE AGENDA AND A BETTER MAN FOR A BETTER AMERICA, BOB DOLE.

THANK YOU, LADIES AND GENTLEMEN FOR BEING PART OF THIS QUEST IN WORKING WITH US TO RESTORE THE AMERICAN DREAM.

I'D LIKE TO WELCOME YOU DELEGATES AND QUESTS TO THE 1996 REPUBLICAN NATIONAL CONVENTION. WHAT WE'RE DOING HERE THIS WEEK IS CELEBRATING REPUBLICAN IDEAS AND ACHIEVEMENTS, THE IDEAS AND ACHIEVEMENTS THAT REPRESENT THE FIRST STEP IN OUR CAMPAIGN TO RESTORE THE AMERICAN DREAM OF MORE AND BETTER JOBS; OF STRONGER FAMILIES AND A RETURN TO TRADITIONAL VALUES.

WE'RE HERE TO TALK AND TO LISTEN TO OUR DELEGATES AND TO AMERICA ABOUT THE COMMON-SENSE PROPOSALS THAT ARE RIGHT FOR OUR FAMILIES, FOR OUR COMMUNITIES, AND FOR OUR COUNTRY.

THESE COMMON-SENSE REPUBLICAN PROPOSALS ARE THE FIRST STEP IN RESTORING THE AMERICAN DREAM BECAUSE REPUBLICANS CARE ABOUT AMERICA.

WE CARE ABOUT WORKING PEOPLE. THAT'S WHY WE WANT THEM TO EARN MORE FOR THEIR WORK AND GET TO KEEP MORE OF WHAT THEY EARN.

WE CARE ABOUT FAMILIES, AND THAT'S WHY WE WANT TO CUT THEIR TAXES AND GET GOVERNMENT OUT OF THEIR LIVES SO THEY CAN MAKE THEIR OWN DECISIONS ABOUT WHAT'S RIGHT FOR THEIR CHILDREN.

WE CARE ABOUT CHILDREN. THAT'S WHY WE WANT TO WIN THE WAR ON DRUGS AND NOT JUST RUN UP THE WHITE FLAG.

WE CARE ABOUT PEOPLE ON WELFARE. THAT'S WHY WE WANT TO GET THEM OFF WELFARE AND BACK ON THE ROAD THAT LEADS THEM TO A BETTER LIFE FOR THEMSELVES AND FOR THEIR KIDS. FOR THE KIDS OF WELFARE FAMILIES ARE THE POWs OF THE LIBERAL WAR ON POVERTY.

THAT'S ALL PART OF RESTORING THE AMERICAN DREAM. AND UNDER THE LEADERSHIP OF PRESIDENT BOB DOLE. WE REPUBLICANS CAN AND WILL RESTORE THE AMERICAN DREAM.

FIG.5

CREATING SUMMARIES ALONG WITH INDICATORS, AND AUTOMATICALLY POSITIONED TABS

BACKGROUND OF THE INVENTION

1. Field of Invention

This invention relates to a method and a system for automatic text processing. In particular, this invention relates to a method and system for generating a document summary with document navigation information.

2. Description of Related Art

Automatically generated document summaries serve a valuable function by reducing the time required to review documents. Conventional summaries, while providing a good indication of the total content of the summarized document, do not provide any means for accessing the content of the document. Therefore, if a reader is particularly interested in a certain portion of the summary, the reader is forced to scan the text of the entire document to locate the portions of the document that correspond to points of interest in the summary. There exists a need for assisting a reader in locating portions of a document that correspond to portions of the summary.

SUMMARY OF THE INVENTION

This invention generates a summary page that includes indicators that help the user find the corresponding place in the summarized document from which the summary information was extracted or to which the summary information is most related. This invention enables the user to navigate from the summary to the related locations in the document. This invention also highlights the portions of the document that have been extracted for the summary.

This invention connects the summary information with the contents of the summarized document by adding location information and/or navigation information to the summary. The method and the system of this invention work with conventional image or text document summarization systems by preserving the location information of the content that is extracted from a document and by generating a summary with indicators that indicate the corresponding locations in the document from which each portion of the summary was extracted. In one embodiment, these indicators indicate page and line numbers and have matching indicators within the summarized document.

This invention prepares a file from the document for input into a conventional document summarizer, receives the output from the automatic document summarizer and conditions the output to provide indicators to the output summary and document.

The indicators of this invention enable the user to quickly access the corresponding portions of the document that are related to the summary by directly accessing the document using the information indicated by the indicator or by locating a matching indicator within the outputted document. This task is made easier by highlighting the extracted portions within the outputted document.

This invention uses an automatic summarizer, linked to a device that can identify the page image and page location in the original document where the summary material is located. The location information is generated by a conventional or modified text or image summarizer. In image summarization, a page number can be found by applying image matching methods. In the case of text summarization, conventional printing software can be modified such that the page numbers assigned by it are made known to the software implementing the present invention.

BRIEF DESCRIPTION OF THE DRAWINGS

The preferred embodiments of this invention will be described in detail, with reference to the following figures, wherein:

FIG. 5 shows the source document that was analyzed to produce the summary of FIG. 4.

DETAILED DESCRIPTION OF PREFERRED EMBODIMENTS

Figure 1:
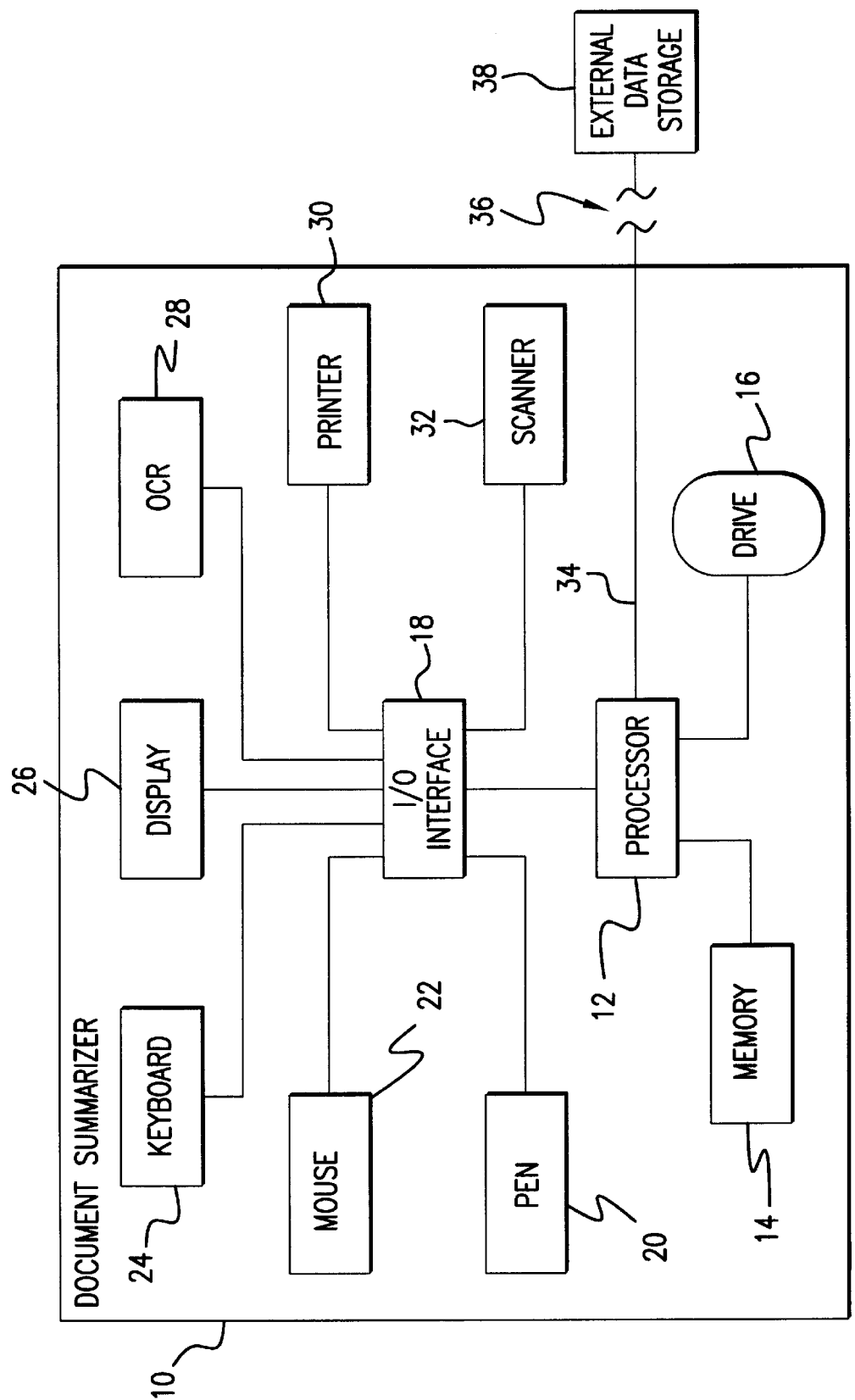
FIG. 1 is a block diagram of one embodiment of the document summarizer of this invention.

FIG. 1 shows a block diagram of one embodiment of the document summarizer 10 of this invention. The document summarizer 10 includes a processor 12 communicating with a memory 14 and a hard drive 16. The processor 12 also communicates through an input/output interface 18 to any number of conventional input/output devices such as a pen 20, a mouse 22, a keyboard 24, a display 26, an optical character recognition system 28, a printer 30, and a scanner 32. The input/output devices 20–32 are operated by a user to control the operation of the document summarizer 10. The processor 12 also communicates through link 34 to an external data source 38. The link 34 includes an interruptible connection 36.

As shown in FIG. 1, the system 10 is preferably implemented using a programmed general purpose computer. However, the system can be implemented using a special purpose computer, a programmed microprocessor or microcontroller and any necessary peripheral integrated circuit elements, an ASIC or other integrated circuit, a hardwired electronic logic circuit such as a discrete element circuit, a programmable logic device such as a PLD, PLA, FPGA, or PAL, or the like. In general, any device on which a finite state machine capable of implementing the flowcharts shown in FIGS. 2A and 2B can be used to implement the system 10.

Additionally, as shown in FIG. 1, the memory 14 is preferably implemented using static or dynamic RAM. However, the memory 14 can also be implemented using a floppy disk and disk drive, a writeable optical disk and disk drive, a hard drive, flash memory, or the like. Additionally, it should be appreciated that the memory 14 can be a distinct portion of a single memory or physically distinct memories.

Further, it should be appreciated that the link 34 connecting the microprocessor 12 to the external data source 38 can be a wired or a wireless link to a network (not shown). The network can be a local area network, a wide area network, an intranet, the Internet, or any other distributed processing and storage network. In this case, a document may be downloaded from an external data source 38 for processing by the system 10 according to the method outlined below.

Figure 2A:
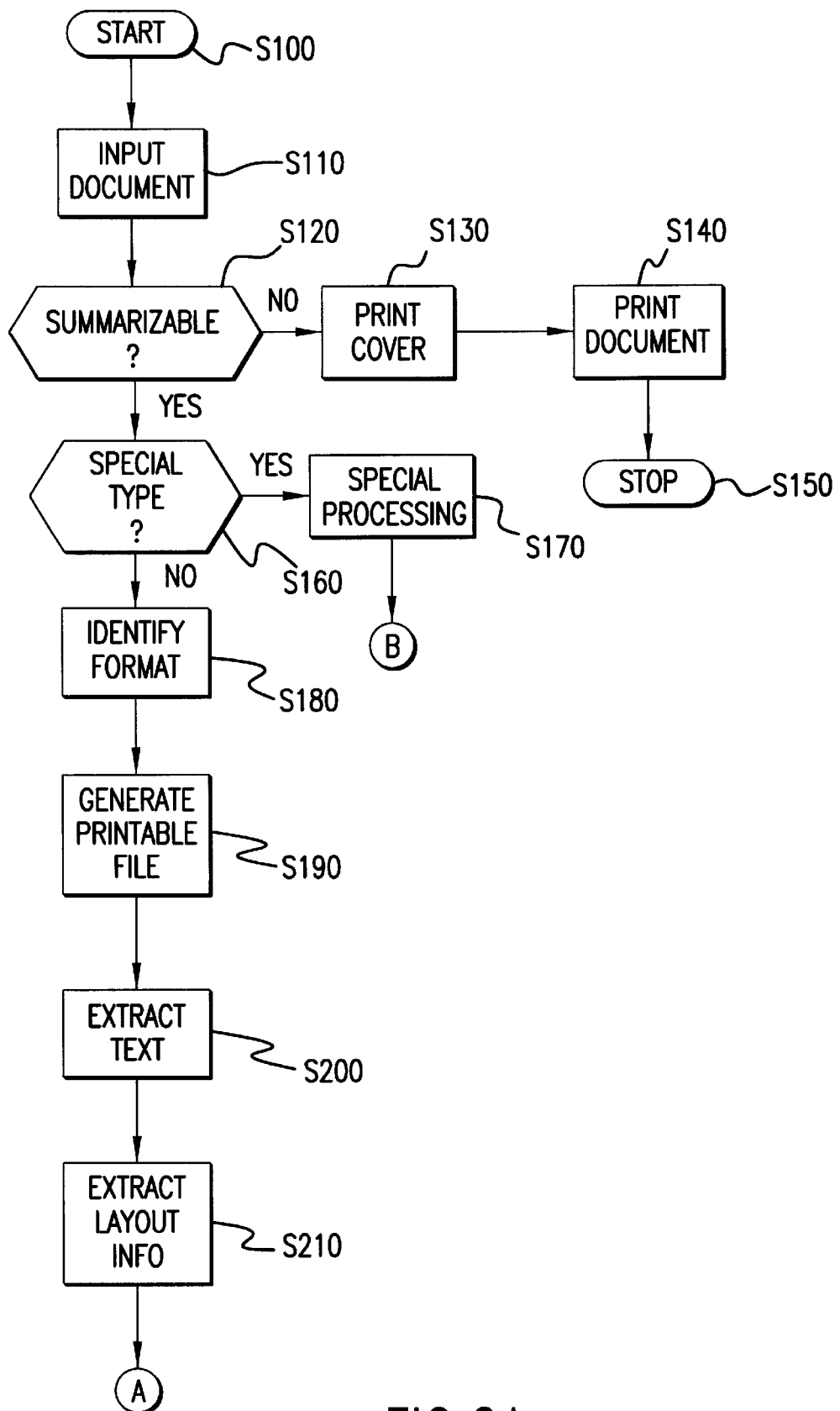
FIGS. 2A–2B show a flowchart outlining the control routine of one embodiment of this invention.
Figure 2B:
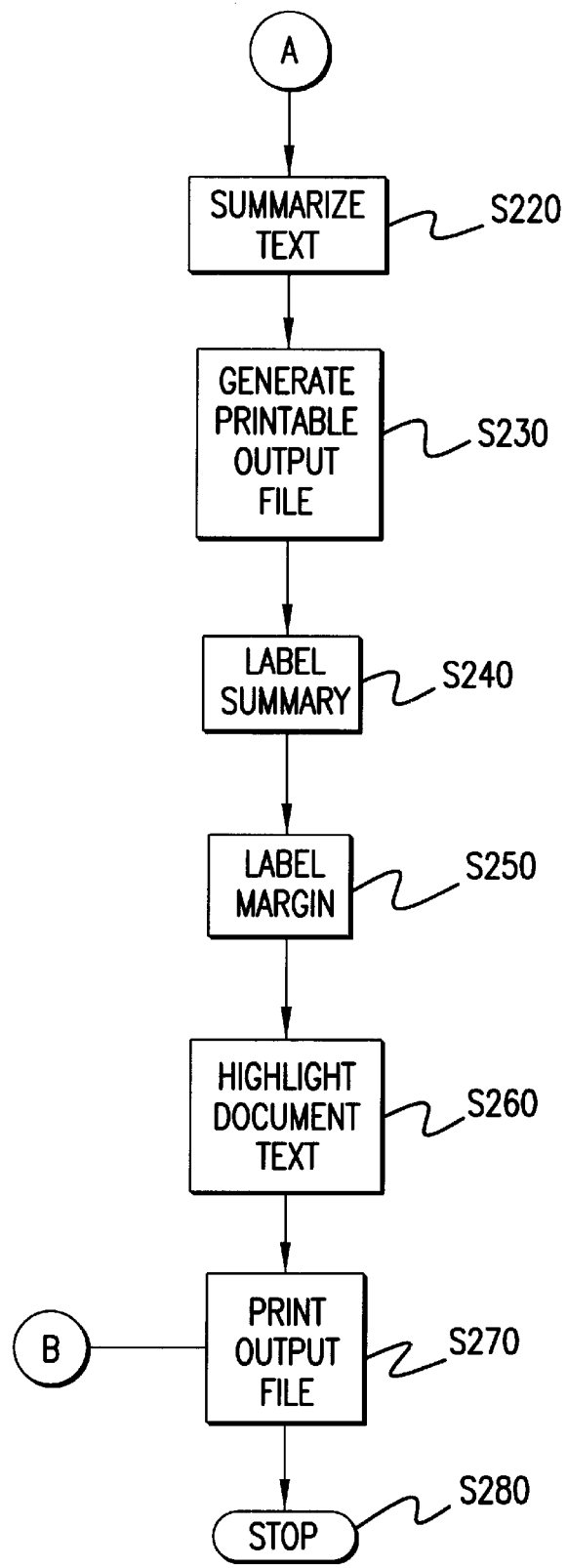

FIGS. 2A and 2B show a flowchart outlining the control routine of one embodiment of the method of this invention. Beginning in step 100, the control routine continues to step S110 where a document is input into the system 10. In step S120, the control routine determines whether the document is summarizable. If the document is not summarizable, the control routine continues to step S130. In step S130, the control routine prints a "generic" cover sheet and continues to step S140. The "generic" cover sheet may include any type of information that may not be related to the input document. In step S140, the document is printed and the control routine continues to step S150 where the control routine stops.

If in step S120, the control routine determines that the document is summarizable, the control routine jumps to step S160. In step S160, the control routine determines if the document is of a special type that requires or may benefit from special processing. A document of a special type may be identified by a user. An example of a special type includes a group of e-mail messages that each have a summary field. This example will be explained in more detail below.

If the document is of a special type, the control routine continues to step S180. However, if the control routine determines that the document is not in a special format, the control routine jumps to step S180. In step S170, the control routine extracts the summary information in accordance with the special processing and jumps to step S270.

In step S180, the control routine identifies the format of the document and continues to step S190. In step S190, the control routine generates a printable file from the input document. This printable file is necessary to generate layout information which will be used in subsequent steps. The control routine then continues to step S200 where the control routine extracts text from the printable file and creates another file that is suitable for processing by a summarizer. Then the control routine continues to step S210 where the control routine creates a layout file having position information on the printable file created in step S190 and corresponding pointers to the extracted text file created in step S200. The control routine then continues to step S220, where the control routine analyzes the extracted text file to determine which portions of text will be included in the summary. The control routine may use a conventional or modified text summarizer. The control routine then continues to step S230 where the control routine generates a printable output file by concatenating the summary text in the printable file created in step S190. Preferably, the summary is placed in the output file before the original document in a cover page. The control routine then continues to step S240. In step S240, the control routine modifies the output file by attaching indicators that indicate the location of the portions of the summary in the original document. The indicators are created by referring to the extracted text file and to the layout file. The control routine then continues to step S250 where the output file is modified to place the indicators in the margin of the cover page. The control routine then continues to step S260.

In step S260, the control routine modifies the output file by adding additional indicators that are positioned adjacent to the portions of the document that correspond to portions of the summary. The control routine also highlights the indicated portions of the document in step S260. The control routine then continues to step S270. In step S270, the control routine sends the output file to a printer to print the document and then continues to step S280 where the control routine stops.

If the input document is identified as requiring special processing in step S160 then the control routine continues to step S170. In step S170, the control routine generates an output file that has a summary page with indicators that indicate from where each portion of the summary originated in the input document. The intention of steps S160 and S170 are to make clear that one of ordinary skill in the art would know that steps S180–S260 can be modified in accordance with the input document type and still form a part of the invention.

One example of an input file that could benefit from special processing is a document that includes several e-mail messages that each have a "subject" field. The control routine recognizes that such a document requires or can benefit from special processing. Alternatively, a user can identify the input document as requiring special processing to the control routine with a user interface (not shown). In this example, the processing would take advantage of the knowledge that there are predefined "subject" fields and will generate a summary from these "subject" fields and thereby obviate the necessity of performing a text summarization process on the document. The summary would include the text from each "subject" field along with indicators that indicate the position in the output file where each portion of the summary may be found.

A specific example of the operation of this invention will now be described while referring to the flowcharts of FIGS. 2A and 2B. The source document in this example is a PostScript file. PostScript is a page-description language from Adobe Systems, Inc. that offers flexible font capability and high-quality graphics. PostScript uses English-like commands to control page layout and to load and scale outline fonts. A page description language describes output to a printer or a display device using instructions from the page-description language to construct text and graphics and to, thereby, create the required page image.

Processing of the PostScript file starts at step S100 and continues to step S110 where the file is input to the system. The control routine continues to step S120 where the control routine determines that the document is summarizable and then continues to step S160 where the control routine determines that the PostScript file is not one of a predetermined special type.

The control routine continues to step S180 where the format of the input document is identified as PostScript. The control routine continues to step 190 where the control routine generates a printable output file. In this example, because the PostScript file is already printable, the control routine merely makes a copy of the input document as the printable output file. Therefore, the printable output file is also a PostScript file. The control routine then continues to step S200 where the text is extracted from the printable file. The control routine continues to step S200 where the control routine extracts the text using a modified PostScript interpreter and a text extraction program. In step S200, the PostScript interpreter analyzes the PostScript file and generates an ASCII file and associated position information. The invention then utilizes a text extraction program. The text extraction program maps font differences, analyzes the stream of characters, and picks out words, lines, and paragraphs. The text extraction program also records the location information in accordance with the identified, extracted text. The control routine then continues to step S210. In step S210 the control routine generates a layout file and continues to step S220.

In step S220, the system analyzes the ASCII file using a text summarizer to determine what portions of the extracted text are to be included in the summary. The control routine then continues to step S230 where a PostScript generator creates a printable output file. In step S230, the output file is created using the summarized text from step S220 and the position information corresponding to the summarized text from the layout file created in step S210. The control routine then continues to step S240. In step S240, the control routine modifies the output PostScript file with instructions that add indicators to the summary. The control routine then continues to step S250. In step S250, the control routine appends the output PostScript file with instructions that add indicators to the margin of the cover page. The control routine then continues to step S260.

In step S260, the control routine modifies the output PostScript file to highlight those portions of the document that correspond to the portions of the summary. The control routine then continues to step S270 where the control routine sends the output PostScript file to a printer and then continues to step S280 where the control routine stops.

It should be appreciated that while the invention has been described above in connection with PostScript and ASCII text files that this invention may be used in conjunction with any type of document format including, for example, any type of graphic, audio, and video document formats.

It should also be appreciated that steps S210, S220 and S240 are all optional and that the indicators may take whatever form is appropriate for the desired style of output. The indicators only need to provide a reference to the document content by providing position information or as an indicator to be matched with another indicator within the document.

Additionally, while the embodiment of the control routine described above and in FIGS. 2A and 2B generates a single output file, one of ordinary skill understands that the control routine may generate any number of output files such as, for example, a first output file having only the cover page with a summary and a second output file having only the document.

Typical document summarizers present the sentences in the summary in the same order that the sentences are encountered in the summarized document. However, these sentences may not be in the same order in the summary as they appear in the related document. In that case, the indicators may be presented in the summary in the order that the summary presents the sentences or in the order in which the sentences appear in the related document. If the indicators are to appear on the summary page in the order that the sentences appear in the related document, then leaders may be provided from the indicators to each of the corresponding portions of the summary.

The output of the summarized document may not facilitate easy positioning of indicators to readily indicate which portions of the summarized document correspond to the indicator. Therefore, leaders may also be added from the indicators in the summarized document to the portions of the summarized document that have been extracted for the summary.

The indicators may be placed on the summary page in a vertical position on the margin that corresponds to the vertical position of the corresponding portions of the summarized document. Such an arrangement makes it easier for a user to find an indicator within the summarized document when flipping through a document. Indicators in the summarized document may be eliminated very quickly when the vertical position does not match the vertical position of the indicator in the summary sheet. On the other hand, an indicator that has a vertical position that matches the vertical position of the corresponding indicator in the summary sheet can quickly indicate the correspondence between the two indicators to the user of the document.

Additionally, this invention also provides indicators to a list of keywords. Conventional document cataloging systems generate a list of keywords that may be quickly searched to locate a document related to the keyword. This invention is also useful with a keyword list generating system to provide indicators adjacent the keywords to indicate the location of the keywords within the summarized document.

The indicators may also take the form of a background color or font color on a portion of the document summary. In this case, a matching indicator in the summarized document is highlighted using a background or font color that matches the corresponding portion of the summary. The indicators may also take the form of character attributes such as Bold or Italics. In this case, for example, a portion of the summary may be bold while another portion is italicized. The correspondence to the original document would be indicated because the source text would have a corresponding character attribute. It is to be understood that the indicators may take any form that allows one to distinguish between indicators and also indicates the correspondence of each portion of the summary to the source in the underlying original document.

Figure 3:
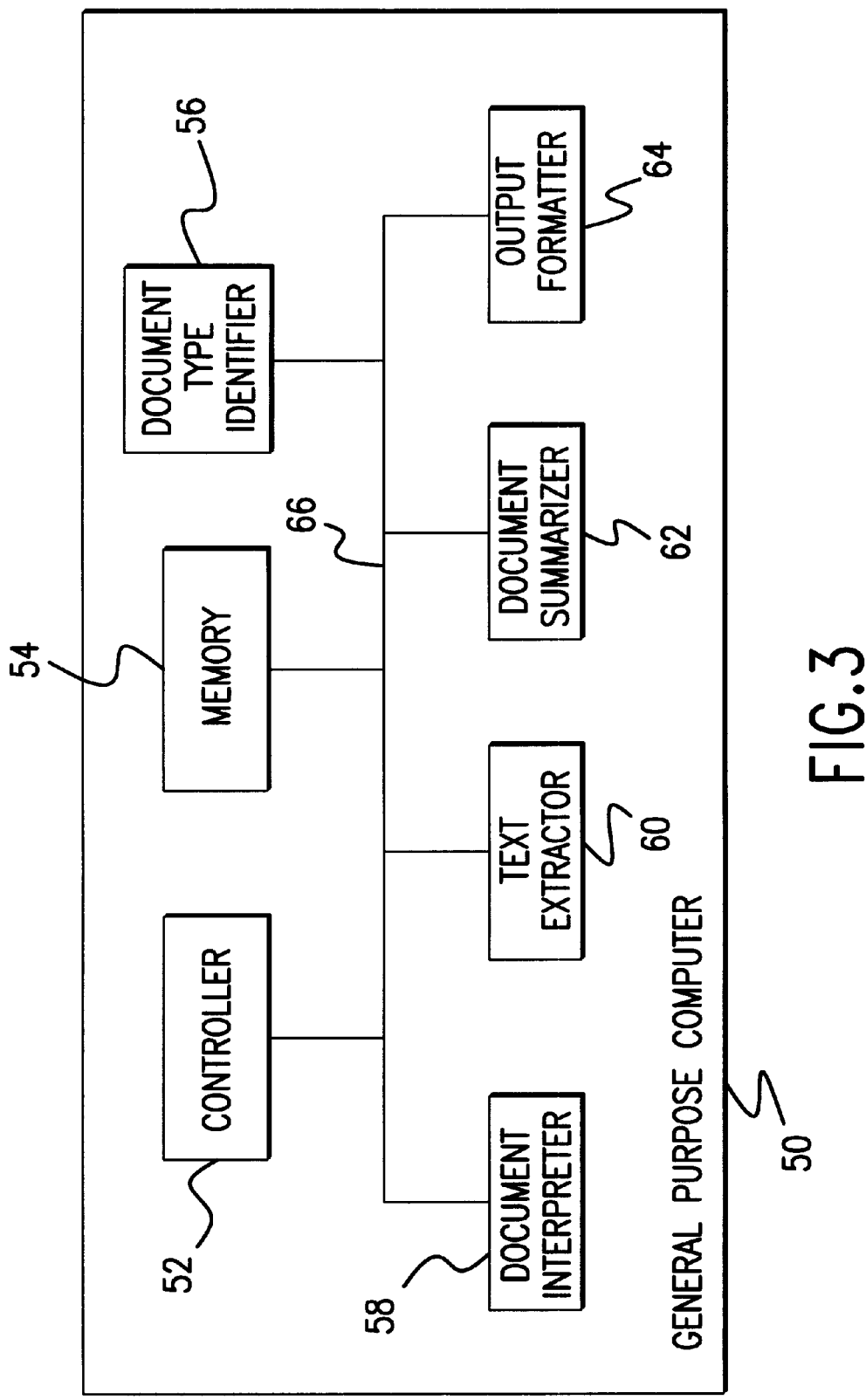
FIG. 3 is a block diagram of one embodiment of a processor of this invention.

FIG. 3 shows a block diagram of one embodiment of the processor 12 of this invention. The processor 12 is preferably implemented using a general purpose computer 50. The general purpose computer 50 preferably includes a controller 52, a memory 54, a document type identifier 56, a document interpreter 58, a text extractor 60, a document summarizer 62, an output formatter 64, and a bus 66. The elements of the general purpose computer 50 are interconnected by the bus 66. The document type identifier 56, the document interpreter 58, the text extractor 60, the document summarizer 62, and the output formatter 64 are used to implement the flowchart of FIGS. 2A and 2B. It should be appreciated that the document type identifier 56, the document interpreter 58, the text extractor 60, the document summarizer 62, and the output formatter 64 are preferably implemented as software routines running on the controller 52 and stored in the memory 54. It should also be appreciated that many other implementations of these elements will be apparent to those skilled in the art.

It should be understood that the term "document" is intended to include text, audio, video, or any other information storing file in any combination of information storing files. Further, it should be understood that the term "text" is intended to include text, digital ink, audio, audio bars, video, or any other content of a document, including a document's structure. It should also be appreciated that the term "display" is intended to include any type of presentation device appropriate for the type of text in the document. It should be further understood that the term "portion" is intended to include any divisible structure of a document such as, for example, words, sentences, phrases, paragraphs, sections, pages, and any other distinguishable portion of a document. Structural information designates divisible portions of documents.

Figure 4:
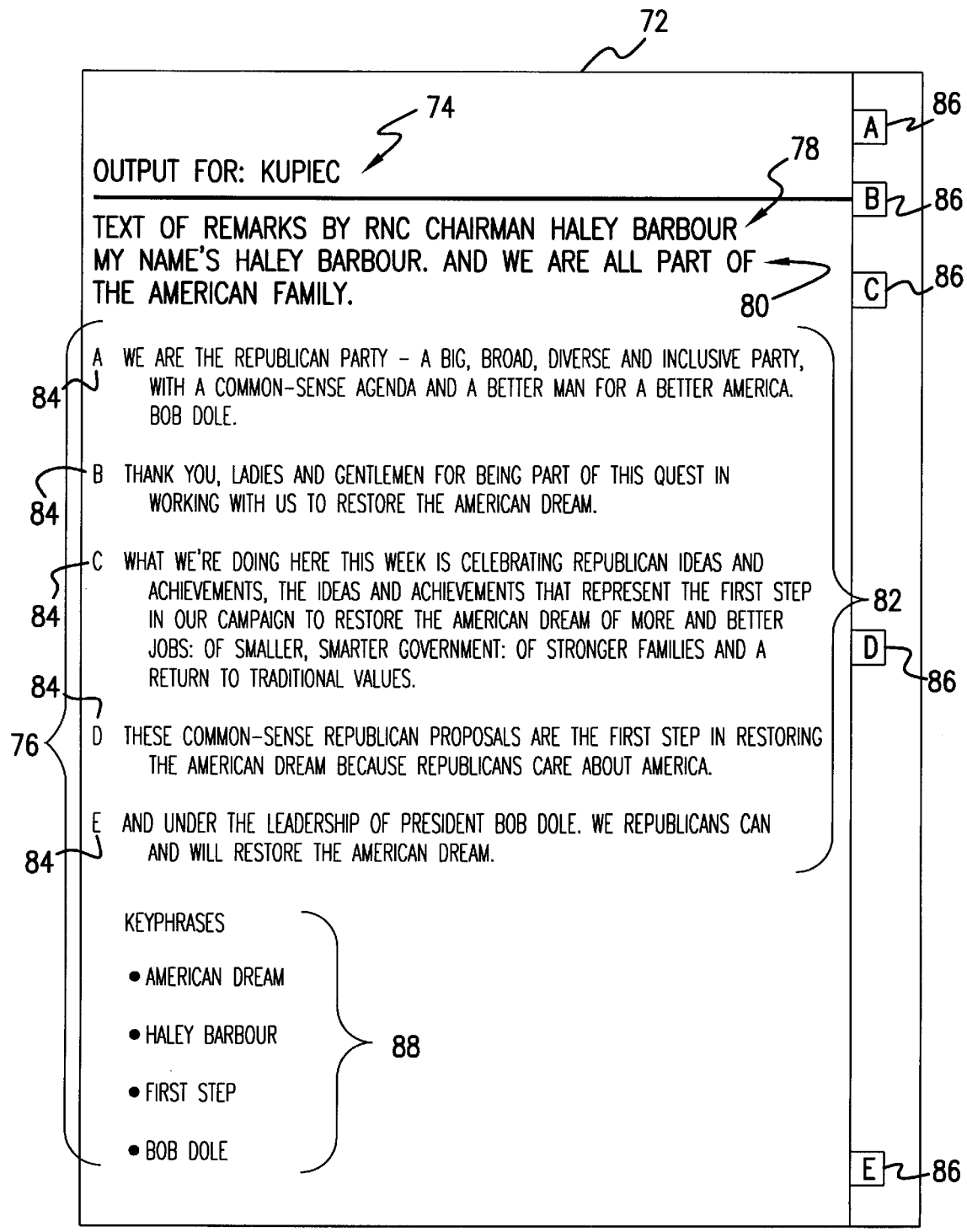
FIG. 4 is a sample summary generated by one embodiment of this invention.

FIG. 4 shows a sample output of one embodiment of this invention. FIG. 5 shows the source document 70 which has been summarized.

A summary sheet 72 includes a header 74 and a summary 76. The summary sheet 72 also includes the title of the summarized document 78 adjacent to an extracted portion of the document 80 that generally reflects the overall content of the document. The summary 76 includes extracted portions 82 which reflect the content of portions of the summarized document 70 and a list of keywords 88. Indicators 84 have been placed adjacent to the corresponding extracted portions 82. These indicators 84 have corresponding tabs 86 positioned on the margin of the summary sheet 72. The tabs 86 indicate the vertical position of the extracted portion in the summarized document 70 that correspond to the indicators 84. In this example, the summarized document has not been output with indicators or tags that correspond to the indicators 84 and tags 86 of the summary sheet. It should be appreciated that other embodiments of this invention may provide indicators and tabs in the output of the summarized document 70.

While the above explanation and description has generally referred to position and location information, it is to be understood that the indicators of this invention include valuable navigation information as a result of the fact that the indicators include position information. Therefore, the indicators include navigation information which is helpful to a user to navigate a document to locate the position in a document from which a particular portion of summary originated.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for summarizing a document using a document summarizer, the method comprising:
   extracting text from the document along with corresponding location information;
   identifying portions of the extracted text that reflect the content of the document;
   generating a presentation file that includes the identified portions, and a first set of unique indicators and corresponding unique tabs that are automatically positioned within the presentation file, each unique indicator corresponding to one of the identified portions and indicating the location of a corresponding extracted text in the document, and each unique tab indicating a vertical position of the extracted text in the presentation file; and
   presenting the presentation file.

2. The method of claim 1, wherein the location information comprises page and line numbers.

3. The method of claim 1, where the location information comprises structural information.

4. The method of claim 3, where the structural information comprises one of a volume number, a section number, a chapter number, a paragraph number, a sentence number, a phrase number, and a word number.

5. The method of claim 1, where the location information comprises layout information.

6. The method of claim 1, where the location information comprises vertical and horizontal position information.

7. The method of claim 1, further comprising identifying the document as being of a predetermined type, wherein the extracting and identifying correspond to the predetermined type.

8. The method of claim 7, where the document is identified as being of a predetermined type by a user input.

9. The method of claim 1, where the generating comprises placing the first set of indicators adjacent to the corresponding identified portions on the summary.

10. The method of claim 9, where the generating further comprises placing a second set of indicators on the margin of a summary page at the vertical positions that correspond to the vertical positions of the corresponding extracted text portions of the document and where the second set of indicators correspond to the first set of indicators.

11. The method of claim 10, where the to generating further comprises generating leaders from each of the first set of indicators to each of the corresponding second set of indicators.

12. The method of claim 1, where the to generating comprises:
   generating a second set of indicators that correspond to the first set of indicators; and
   placing the second set of indicators in the layout of the document adjacent to the corresponding extracted text.

13. The method of claim 12, wherein the first set of indicators comprise presenting each corresponding portion of summary in a presentation attribute that corresponds to the second set of indicators that comprise the presentation of the corresponding extracted text of the document in the same corresponding presentation attribute.

14. The method of claim 13, wherein the presentation attribute is one of bold, italics, capitals, underline, character size, font, font color, background color, contrast, intensity, brightness, flashing, scrolling, motion, volume, reverberation, tone and balance.

15. An automatic document summarizer system, comprising:
   a processor that comprises:
      a text extractor that extracts text from a document along with corresponding extracted text location information;
      a document summarizer that identifies portions of the extracted text that reflect the content of the document; and
      a presentation file formatter that formats the layout of a presentation file that includes the identified portions, and a first set of unique indicators and corresponding unique tabs that are automatically positioned within the presentation file, each unique indicator corresponding to one of the identified portions and indicating the location of a corresponding extracted text in the document, and each unique tab indicating a vertical position of the extracted text in the presentation file; and
   a presentation system that presents the presentation file.

16. The summarizer of claim 15, where the location information comprises page and line numbers.

17. The summarizer of claim 15, where the location information comprises structural information.

18. The summarizer of claim 15, where the structural information comprises one of a volume number, a section number, a chapter number, a paragraph number, a sentence number, a phrase number, and a word number.

19. The summarizer of claim 15, where the location information comprises layout information.

20. The summarizer of claim 15, where the location information comprises vertical and horizontal position information.

21. The summarizer of claim 15, wherein the processor further comprises a document type identifier that identifies the document as being of a predetermined type, wherein the text extractor extracts the text using a method corresponding to the identified predetermined type and the document summarizer identifies portions using a method corresponding to the identified predetermined type.

22. The summarizer of claim 21, wherein the document type identifier comprises a type identifying user interface.

23. The summarizer of claim 15, where the presentation file formatter places the first set of indicators adjacent to the corresponding identified portions in the layout.

24. The summarizer of claim 23, where the presentation file formatter also places a second set of indicators in the margin of a summary page at vertical positions that correspond to the vertical positions of the corresponding extracted text portions of the document and where the second set of indicators correspond to the first set of indicators.

25. The summarizer of claim 24, where the presentation file formatter also generates leaders from each of the first set of indicators to each of the corresponding second set of indicators.

26. The summarizer of claim 15, where the presentation file formatter generates a second set of indicators that correspond to the first set of indicators and places the second set of indicators in the layout of the document adjacent to the corresponding extracted text.

27. The summarizer of claim 26, wherein the first set of indicators comprise presenting each corresponding portion of summary in a presentation attribute that corresponds to the second set of indicators that comprise the presentation of the corresponding extracted text of the document in the same corresponding presentation attribute.

28. The summarizer of claim 27, wherein the presentation attribute is one of bold, italics, capitals, underline, character size, font, font color, background color, contrast, intensity, brightness, flashing, scrolling, motion, volume, reverberation, tone and balance.

* * * * *